(12) United States Patent
Gross et al.

(10) Patent No.: US 10,508,686 B2
(45) Date of Patent: Dec. 17, 2019

(54) SECURING DEVICE AND LINEAR GUIDING MECHANISM

(71) Applicants: AIRBUS OPERATIONS GMBH, Hamburg (DE); THK GmbH, Ratingen (DE)

(72) Inventors: Claus-Peter Gross, Hamburg (DE); Lars Schomacker, Hamburg (DE); Patrick Rollfink, Hamburg (DE); Diana Siehndel, Hamburg (DE); Eiji Hosaka, Ratingen (DE); Torsten Berger, Ratingen (DE)

(73) Assignees: AIRBUS OPERATIONS GMBH, Hamburg (DE); THK GMBH, Ratingen (DE)

( * ) Notice: Subject to any disclaimer, the term of this patent is extended or adjusted under 35 U.S.C. 154(b) by 0 days.

(21) Appl. No.: 16/013,628

(22) Filed: Jun. 20, 2018

(65) Prior Publication Data

US 2018/0298946 A1     Oct. 18, 2018

Related U.S. Application Data

(63) Continuation of application No. PCT/EP2016/082299, filed on Dec. 22, 2016.

(30) Foreign Application Priority Data

Dec. 23, 2015 (DE) .......... 10 2015 122 675

(51) Int. Cl.
*F16C 29/06* (2006.01)

(52) U.S. Cl.
CPC ...... *F16C 29/0609* (2013.01); *F16C 29/0607* (2013.01); *F16C 29/0638* (2013.01); *F16C 29/064* (2013.01)

(58) Field of Classification Search
CPC .............. F16F 29/0607; F16C 29/0609; F16C 29/0638; F16C 29/064; F16C 29/0607
USPC ........................... 384/13, 15, 43, 42, 45, 49
See application file for complete search history.

(56) References Cited

U.S. PATENT DOCUMENTS

| | | | |
|---|---|---|---|
| 2,620,238 A * | 12/1952 | Berthiez | B23Q 11/0875 15/256.5 |
| 4,582,369 A | 4/1986 | Itoh | |
| 5,102,235 A * | 4/1992 | Mugglestone | F16C 29/0609 384/43 |

(Continued)

FOREIGN PATENT DOCUMENTS

| | | |
|---|---|---|
| DE | 3990964 C2 | 2/1996 |
| DE | 202004018114 U1 | 3/2005 |
| DE | 102007021980 B4 | 3/2013 |

OTHER PUBLICATIONS

European Patent Office, International Search Report for PCT/EP2016/082299, dated Mar. 23, 2017, 2 pages.

*Primary Examiner* — Marcus Charles
(74) *Attorney, Agent, or Firm* — Lorenz & Kopf LLP

(57) ABSTRACT

Disclosed is a securing device for providing a movable unit of a linear guiding mechanism with additional safety in that the securing device prevents the movable unit from coming off a guiding rail in case of a bearing malfunction. The securing device comprises at least one securing portion and a coupling portion for coupling the at least one securing portion to the movable unit. The securing portion is engageable with the guiding rail in case of a failure of the movable unit.

12 Claims, 2 Drawing Sheets

(56) References Cited

U.S. PATENT DOCUMENTS

| | | | | |
|---|---|---|---|---|
| 5,275,492 A | * | 1/1994 | Shirai | F16C 29/0607 384/15 |
| 6,086,254 A | | 7/2000 | Lyon | |
| 6,315,449 B1 | * | 11/2001 | Mueller | B23Q 1/262 384/10 |
| 7,287,906 B2 | * | 10/2007 | Wasson | F16C 29/008 384/12 |
| 7,465,091 B2 | * | 12/2008 | Hsu | F16C 29/0664 384/13 |
| 8,821,019 B2 | * | 9/2014 | Peschke | F16C 29/025 384/12 |
| 9,169,868 B2 | * | 10/2015 | Hsu | F16C 29/0642 |
| 2009/0196539 A1 | * | 8/2009 | Pfeuffer | F16C 29/0609 384/45 |
| 2013/0294713 A1 | | 11/2013 | Hsu | |

\* cited by examiner

SECURING DEVICE AND LINEAR GUIDING MECHANISM

CROSS-REFERENCE TO PRIORITY APPLICATIONS

This application is a continuation of international patent application number PCT/EP2016/082299, having an international filing date of Dec. 22, 2016, which claims priority to German patent application number 102015122675.8, having a filing date of Dec. 23, 2015. The content of the referenced applications is incorporated by reference herein.

TECHNICAL FIELD

The technical field relates to a securing device configured to be coupled to a movable unit of a linear guiding mechanism and configured to secure the movable unit to a guiding rail of the linear guiding mechanism. Furthermore, the technical field relates to a linear guiding mechanism comprising a securing device.

BACKGROUND

Linear guiding mechanisms comprising movable units can be used for movably supporting elements in an aircraft. Such linear guiding mechanisms may comprise a guiding rail and a movable unit movably mounted on the guiding rail. The movable unit can withstand loads acting in directions different from the movement direction of the movable unit to a certain extent. Furthermore, the movable unit is adapted to support a desired element movably on the guiding rail.

BRIEF SUMMARY

Linear guides providing reliable supporting strength while fulfilling the necessary safety requirement in aircraft industry are bulky and heavy.

There may be a need to provide a securing device for use in connection with a linear guiding mechanism, which eliminates the above drawbacks.

The teachings as hereinafter defined for an embodiment of the present disclosure directed to a securing device also apply to embodiments of the present disclosure directed to a linear guiding mechanism with a securing device and vice-versa.

According to one of various aspects of the present disclosure, a security device configured to be coupled to a movable unit of a linear guiding mechanism and configured to secure the movable unit to a guiding rail of the linear guiding mechanism is provided. The securing device comprises at least one securing portion and a coupling portion. The coupling portion is configured to couple the at least one securing portion to the movable unit. The securing portion is engageable with the guiding rail in case of a failure of the movable unit in order to prevent the movable unit from coming off the guiding rail.

A securing portion may refer to any portion of the securing device which is able to engage with the guiding rail in such a manner that the securing device cannot come off the guiding rail. For example, a securing portion can be a portion of the securing device which is specifically designed to at least partially encompass the guiding rail in a manner allowing that the securing device can be moved along the guiding rail without contacting the same. On the other hand, since the securing portion partially encompasses the guiding rail, the movement of the securing device in a direction perpendicular to the movement direction along the guiding rail will lead to a contact between the securing portion and a portion of the guiding rail thus preventing an indefinite movement of the securing device. Accordingly, any element coupled to the securing device will be prevented from coming off the guiding rail.

In order to couple the securing device to a movable unit, the securing device comprises the coupling portion. A coupling portion may refer to any portion of the securing device by means of which it is possible to couple the securing device to the movable unit of the linear guiding mechanism. For example, the coupling portion can comprise a specific means for mounting the securing device to the movable unit, e.g. a bore for receiving a screw or centering protrusions to be inserted into mating openings formed in the movable unit. On the other hand, it is also possible to form the securing device integrally with the movable unit. In this case, the coupling portion may refer to a portion of the securing device connecting the securing portion with the movable unit.

In this context, "able to engage" or "engageable" means that an engagement is caused under certain conditions only and the securing portion is normally not in contact with the guiding rail. In other words, under normal conditions, the securing portion is not engaged with the guiding rail but is constructed and arranged such that an engagement will take place in case the securing device is moved in a direction different from the movement direction of the movable unit, for instance. In order to render the securing portion "engageable", it is possible to provide a securing portion which is placed and guided in close vicinity to the outer circumferential surface of the guiding rail when the securing device is mounted to the movable unit of the linear guiding mechanism. In this way, only a small movement of the securing device in a direction perpendicular to the moving direction of the movable unit is necessary for establishing an engagement between the securing portion and the guiding rail. An engagement can thus be understood as contacting in such a way that a further movement of the securing portion with respect to the guiding rail is not possible. In other words, the securing portion is prevented from moving beyond a desired position by a form-fit engagement occurring when the securing portion gets in contact with another element.

Furthermore, in this context, "failure" may refer to a malfunction of the movable unit in such a way that a supporting function of the movable unit in a direction perpendicular to the moving direction of the movable unit, i.e. perpendicular to the extension direction of the guiding rail, is lost. Such a failure may lead to a condition in which the movable unit comes off the guide rail and in which, consequently, the elements mounted to the movable unit are no longer correctly supported and guided on the guiding rail. In particular, a failure or malfunction may refer to a bearing malfunction of a bearing for supporting the movable unit on the guiding rail. For example, a bearing as used in this context can be a ball bearing in which balls run on respective surfaces of the guiding rail and the movable unit.

As will also be obvious from the further description, the securing device is advantageously applied to movable units which do not comprise inherent features for securing the movable unit to the guiding rail but can also be provided to movable units comprising such features as an additional securing element. In this way, securing devices adapted to the movable units to be secured on the guiding rail can be tailormade as to the different security requirements.

With the above mentioned securing device, it is possible to add an additional securing feature to a movable unit of a linear guiding mechanism so that the linear guiding mechanism can be rendered safer. Furthermore, using the above described securing device in a linear guiding mechanism allows a separation of guiding features and securing features. Therefore, it is not necessary to adapt a construction of the movable unit of a linear guiding mechanism with respect to securing functions which could negatively affect the design of the movable unit making the same more complex or bulky. Consequently, since the use of the securing device allows a separation of the guiding features and the securing features, the guiding features and the securing features of a linear guiding mechanism can be optimized independently.

According to an embodiment of the present disclosure, each securing portion comprises one or more abutment portions configured to limit a movement of the securing portion with respect to the guiding rail in at least a direction different to the movement direction of the movable unit. Accordingly, the one or more abutment portions can get in contact with a portion of the guiding rail restricting a further movement in the direction of orientation of the abutment portions, for instance.

In this context, the movement direction of the movable unit is to be understood as the direction in which the movable unit is guided along the guiding rail. This movement direction may also be referred to as x-direction or longitudinal direction of the movable unit. A plane perpendicular to the x-direction is referred to as cross sectional plane. The direction which is perpendicular to the x-direction and which is a parallel to a lower portion of the guiding rail is referred to as y-direction. The y-direction may also be referred to as transverse direction of the movable unit. Accordingly, in case the guiding rail is mounted on a horizontal plane, the y-direction extends in parallel to the horizontal plane. A direction which is perpendicular to the x-direction and the y-direction may also be referred to as z-direction.

Since according to this embodiment of the present disclosure, the abutment portions are configured to limit the movement of the securing portion with respect to the guiding rail in at least a direction different to the movement direction of the movable unit the securing device is configured to limit the movement of the movable unit in other directions than the above-described x-direction. For example, the abutment portion can limit a movement of the movable unit in the z-direction.

According to one embodiment of the present disclosure, at least one of the one or more abutment portions is integrally formed with the securing portion. In this way, a structurally durable configuration is available.

For example, the securing portion can be formed hook-like in such a manner that the abutment portion is provided at the end of the hook and faces in the upward z-direction. Accordingly, the abutment portion of this example provides a stop acting in the upward z-direction, i.e. as a stop of a movement of the securing device in the upward z-direction.

According to one embodiment of the present disclosure, each abutment portion is configured to protrude into an elongate groove formed in the guiding rail. An elongate groove formed in the guiding rail may refer to any groove in the guiding rail into which the abutment portion can protrude for securing purposes.

The elongate groove may refer to a groove which has a function different from an engagement with the securing portion. For example, the elongate groove can be formed as a support for a ball bearing, i.e. the elongate groove can comprise ball races. On the other hand, it is possible to provide an elongate groove for securing purposes only, meaning that the elongate groove into which the abutment portion protrudes does not have an additional function besides forming a suitable contact portion for the abutment with the abutment portion. Such an elongate groove for securing purposes may be formed in parallel to a groove comprising ball races, for instance.

According to one embodiment of the present disclosure, at least one abutment portion is at least partially formed on the basis of the shape of a respective elongate groove of the guiding rail.

In other words, the abutment portion can be at least partially formed such that its outer contour follows the outer contour of a respective elongate groove. In this way, it is possible to place the abutment portion close to a wall of the elongate groove while maintaining a substantially constant distance between the wall and the abutment portion.

According to one embodiment of the present disclosure, each securing portion comprises two abutment portions extending towards each other with a configuration to protrude into respective elongate grooves formed on opposite sides of the guiding rail.

In this way, the two abutment portions protrude into respective elongate grooves from opposite sides. In other words, the two abutment portions are arranged such that they can protrude in elongate grooves provided on opposite sides of the guiding rail.

According to one embodiment of the present disclosure, the securing device comprises two securing portions arranged at a predetermined distance from each other, wherein the two securing portions define an accommodating space for accommodating the movable unit. Accordingly, it is possible to accommodate the movable unit between the securing portions.

For example, the two securing portions can be arranged in such a manner that they are arranged on both sides of the movable unit in the longitudinal direction of the movable unit. In other words, when considering the movement or x-direction, one of the two securing portions is arranged in front of the movable unit and one of the two securing portions is arranged behind the movable unit. The securing portion which is arranged in front of the movable unit can also be referred to as leading securing portion and the securing portion which is arranged behind the movable unit can also be referred to as trailing securing portion when considering the movement direction of the movable unit.

According to one embodiment of the present disclosure, the accommodating space is further defined by the coupling portion. In other words, the accommodating space is limited on one side by the coupling portion. In this way, the accommodating space is further defined.

According to one embodiment of the present disclosure, the coupling portion comprises two support sections each of which connecting the securing portions. Thus, the support sections extend between the securing portions.

According to one embodiment of the present disclosure, the support sections are at least partially flat and extend substantially in parallel to each other, wherein each support section comprises a supporting surface for contacting a mounting surface of the movable unit and wherein the support sections are coupled to the securing portions such that the abutment portions are arranged at a predetermined distance from the supporting surfaces.

According to a further aspect of the present disclosure, a linear guiding mechanism is provided. The linear guiding mechanism comprises a guiding rail comprising two guiding grooves arranged on opposite sides of the guiding rail. Furthermore, the linear guiding mechanism comprises a movable unit and a securing device as described before.

Since the linear guiding mechanism comprises the securing device, the movable guide is secured to the rail and cannot come off the rail in case of a failure of the movable unit.

According to one embodiment of the present disclosure, the securing device is mounted on the movable unit by means of the coupling portion such that the at least one securing portion is arranged with its one or more protrusions protruding into a guiding groove.

According to one embodiment of the present disclosure, the securing device comprises two securing portions arranged on opposite sides of the movable unit in a movement direction of the movable unit. With such an arrangement, the movable unit is secured at its leading end and its trailing end by the securing device.

According to one embodiment of the present disclosure, the guiding grooves comprise ball races providing a support for a linear ball bearing.

According to one embodiment of the present disclosure, the movable guide comprises two raceways each guiding multiple balls such that the ball roll axes of the balls contacting the ball races are arranged substantially parallel to each other and perpendicular to the travelling direction of the balls. With such a construction, a compact linear guiding mechanism is achieved.

Accordingly, the present disclosure provides a securing device which can prevent a movable unit of a linear guiding mechanism from coming off the guiding rail even if there is a malfunction in the bearing of the movable unit which leads to a situation in which the bearing can no longer guide the movable unit. In other words, even if a bearing supporting the movable unit on the guiding rail is no longer able to support the movable unit on the guiding rail, the securing device will prevent that the movable unit is separated from the guiding rail. In this way, it is ensured that an element coupled to the movable unit always remains coupled to the guiding rail which leads to an enhanced and more reliable support. The securing device may have a cage structure and can be provided on the movable unit such that the movable unit is accommodated in the cage structure. In other words, the securing device may enclose the movable unit to a sufficient extent and can be formed such that a form-fit coupling is established between the securing device and the guiding rail in case a bearing function between the movable unit and the guiding rail is lost. In this way, the movable unit and further elements coupled to the movable unit remain securely coupled to the guiding rail.

A person skilled in the art can get other characteristics and advantages of the disclosure from the following description of exemplary embodiments that refer to the attached drawings, wherein the described exemplary embodiments should not be interpreted in a restrictive sense.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background on the following detailed description.

Figure 1:
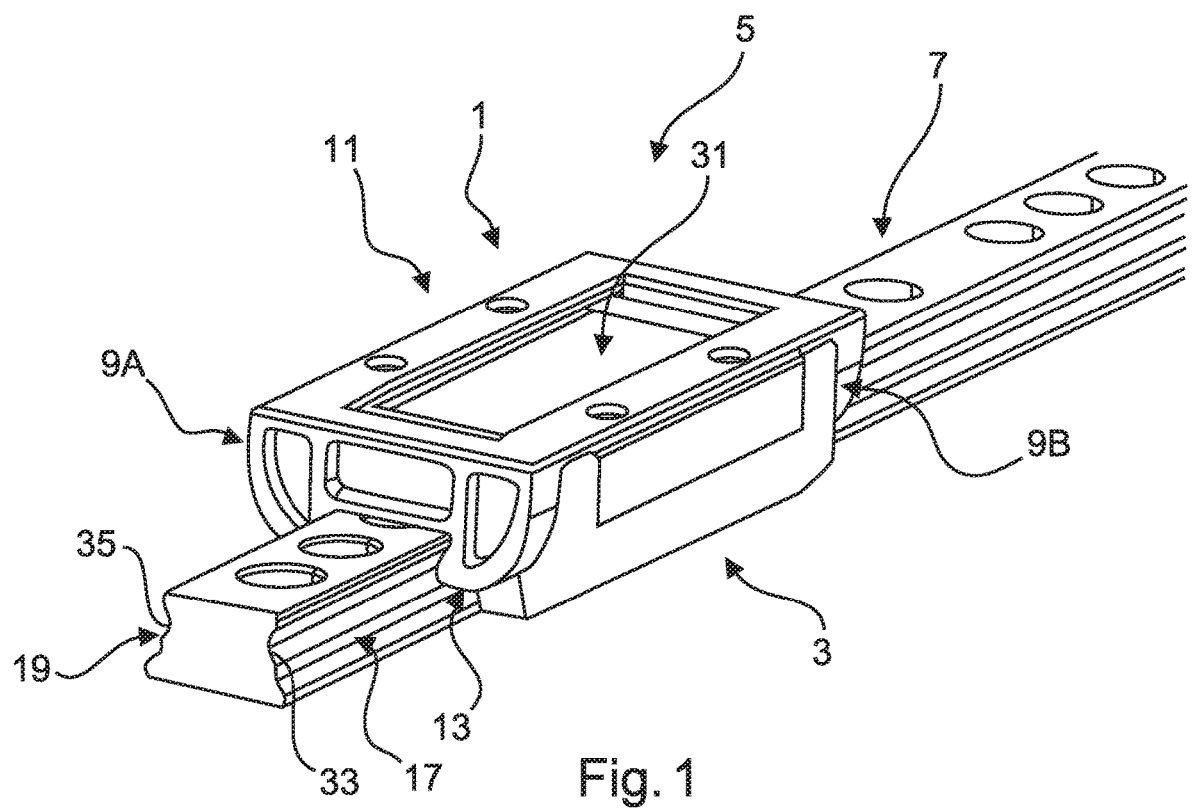
FIG. 1 is a perspective schematic view of a linear guiding mechanism with a securing device according to an exemplary embodiment of the present disclosure.

FIG. 1 shows a perspective schematic view of a linear guiding mechanism 5 with a movable unit 3, a guiding rail 7 and a securing device 1 according to an exemplary embodiment of the present disclosure.

The movable unit 3 is movably engaged with guiding grooves 17, 19 provided on opposite sides of the guiding rail 7 by means of bearings (not shown in FIG. 1). In this way, the movable unit 3 is movable on the guiding rail 7 along the extension direction of the guiding rail 7.

Figure 3:
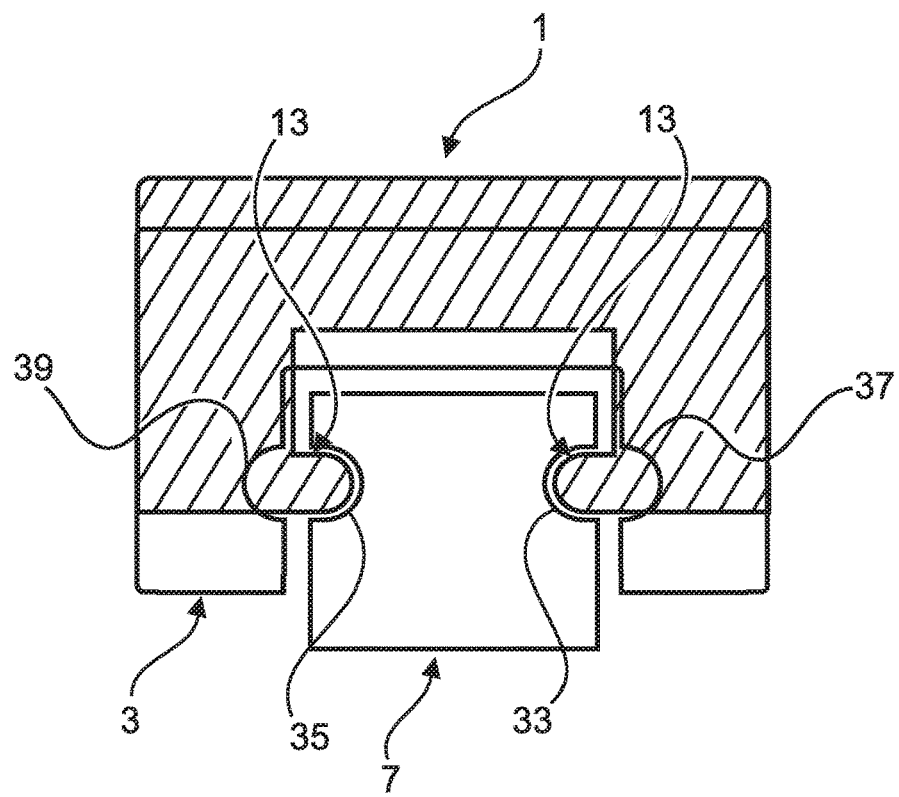
FIG. 3 is a schematic view of a linear guiding mechanism with a securing device according to an exemplary embodiment of the present disclosure as viewed in the movement direction of the movable unit.
Figure 4:
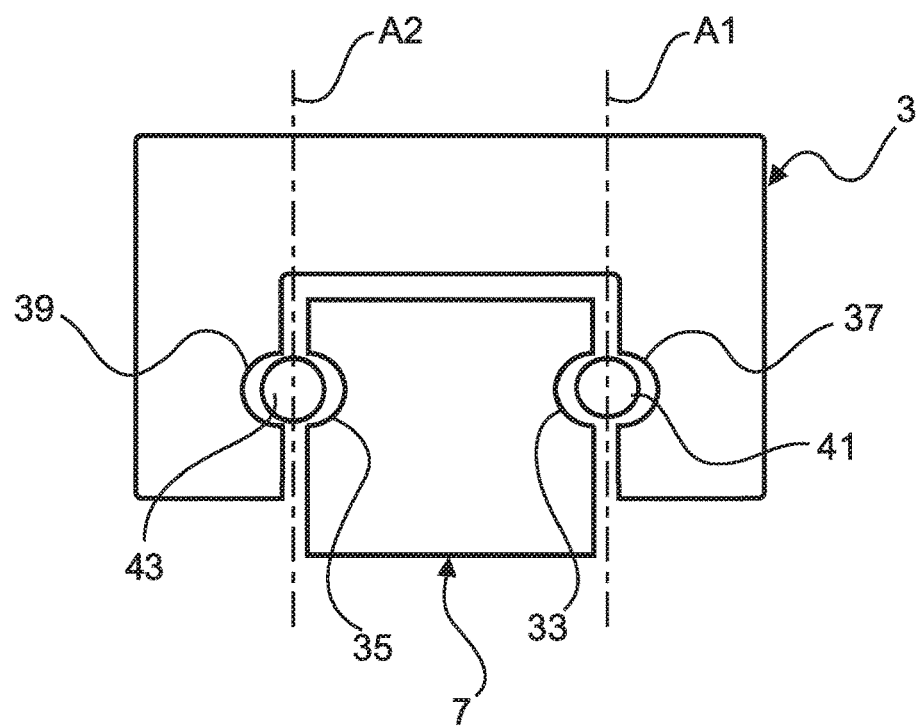
FIG. 4 is a schematic view of a linear guiding mechanism without a securing device.

As is shown in FIGS. 1, 3 and 4, the guiding rail 7 comprises ball races 33, 35 in the respective guiding grooves 17, 19 which provide a support for balls 41, 43 of a linear ball bearing. The movable unit 3 comprises two raceways 37, 39 for guiding the balls 41, 43 of the linear ball bearing, one raceway on each side of the guiding rail 7. In other words, the movable unit 3 is supported on the guiding rail 7 by means of the balls 41, 43. It is to be noted that although only two balls 41, 43 are shown in FIG. 4, multiple balls 41, 43 which are guided in the raceways 37, 39 in a closed loop are used.

In order to enable the movable unit 3 to receive loads in all directions, the guiding grooves 17, 19 may be specifically shaped for an optimum force transfer via the balls 41, 43. For example, the guiding grooves 17, 19 comprising the ball races 33, 35 can have a Gothic-arch shape. As is further shown in FIG. 4, the balls 41, 43 are guided on the guiding rail 7 such that their roll axes A1, A2 are substantially parallel to each other when the balls 41, 43 contact the guiding rail 7. In this way, a compact linear guiding mechanism 5 is provided.

Figure 2:
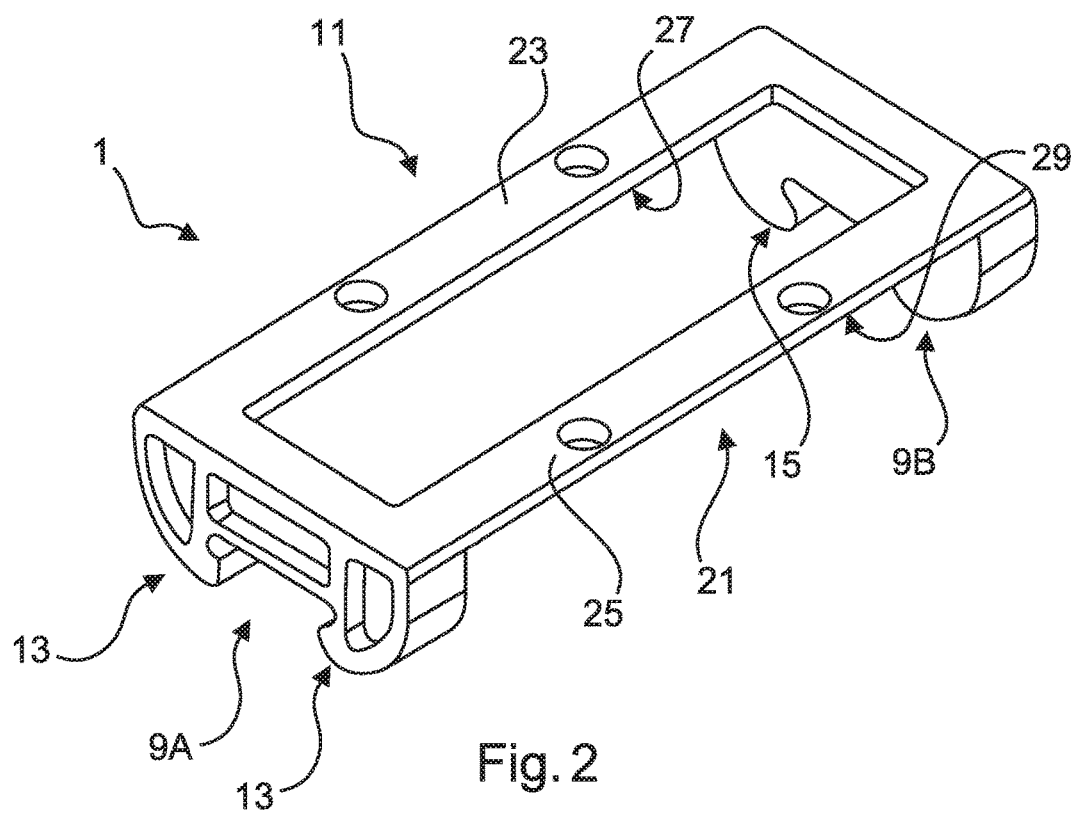
FIG. 2 is a perspective schematic view of a securing device according to an exemplary embodiment of the present disclosure.

As is shown in FIGS. 1 and 2, the securing device 1 comprises two securing portions 9A, 9B which are coupled to each other at their upper ends by means of a coupling portion 11 having two support sections 23, 25. The support sections 23, 25 comprise supporting surfaces 27, 29 which in FIGS. 1 and 2 are the lower surfaces of the support sections 23, 25 facing towards and contacting the movable unit 3 when mounted on the same. More precisely, as shown in FIG. 1, the supporting surfaces 27, 29 contact a mounting surface 31 of the movable unit 3.

An accommodating space 21 is defined by the support sections 23, 25 and the inner end faces of the securing portions 9A, 9B. As is shown in FIG. 1, when the securing device 1 is placed on the movable unit 3, the movable unit 3 is accommodated in the accommodating space 21. As is also shown in FIGS. 1 and 2, multiple fixation bores are provided in the support sections 23, 25 at positions which are aligned with respective threaded openings provided in the movable unit such that the securing device 1 can be threadedly coupled to the movable unit 3. Consequently, when coupled to each other, the securing device 1 and the movable unit 3 form an integral assembly.

The securing device 1 comprises abutment portions 13, 15 provided on the respective securing portions 9A, 9B as is shown in the embodiments of FIGS. 1, 2 and 3. In the present embodiment, the abutment portions 13, 15 are protrusions which are formed so as to protrude in the guiding grooves 17, 19 formed in the guiding rail 7. In the embodiment, the structure of the securing device 1 is rigid. Consequently, it is necessary to slide the securing device 1 onto the guiding rail 7 in the extension direction of the guiding rail 7. As soon as the abutment portions 13, 15 are arranged such that their free ends are located in the guiding grooves 17, 19, the securing device 1 cannot be separated from the guiding rail 7 in a direction perpendicular to the extension direction or longitudinal direction of the guiding rail 7 as a movement of the securing device 1 in a direction perpendicular to the longitudinal direction of the rail would result in the abutment portions 13, 15 contacting sections of the walls of the guiding grooves 17, 19.

On the other hand, the securing device 1 is configured such that in a condition in which the securing device 1 is mounted on a respective movable unit 3, the abutment portions 13, 15 are not in contact with the walls of the guiding grooves 17, 19. In other words, in a mounted condition, the abutment portions 13, 15 are arranged at a distance from the walls of the guiding grooves 17, 19 so that no friction occurs between the abutment portions 13, 15 and the guiding grooves 17, 19 when the movable unit 3 is linearly moved along the guiding rail 7.

Due to the above construction of the securing device 1, the movable unit 3 is accommodated between the guiding rail 7 and the securing device 1 and carries the securing device 1. The securing device 1 does not affect the function of the movable unit 3 but is able to keep the movable unit 3 on the rail in case a supporting function between the movable unit 3 and the guiding rail 7 is lost. In such a case, the movable unit 3 is only allowed to slightly move in a direction perpendicular to the moving direction along the guiding rail 7 until the abutment portions 13, 15 of the securing device 1 contact sections of the guiding grooves 17, 19 and a further movement of the movable unit 3 is limited.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure any way. Rather, the foregoing detailed description will provide those skilled in the art with a convenient roadmap for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A linear guiding mechanism comprising:
   a guiding rail comprising two guiding grooves arranged on opposite sides of said guiding rail;
   a movable unit; and
   a securing device mounted to said movable unit, wherein the securing device is configured to be coupled to the movable unit and to secure the movable unit to the guiding rail, the securing device comprising:
      a first securing portion and a second securing portion arranged at a predetermined distance from each other; and
      a coupling portion comprising two support sections extending between and connecting the first and second securing portions, the coupling portion integrally formed with the first and second securing portions, and the coupling portion configured to couple the first and second securing portions to the movable unit;
   wherein the first securing portion, the second securing portion, and the coupling portion define an accommodating space for accommodating the movable unit; and
   wherein each of the first securing portion and the second securing portion is engageable with the guiding rail in case of a failure of the movable unit, to prevent the movable unit from coming off the guiding rail.

2. The linear guiding mechanism according to claim 1, wherein said securing device is mounted on said movable unit by the coupling portion such that each of the first and second securing portions is arranged with one or more protrusions protruding into a guiding groove of the guiding rail.

3. The linear guiding mechanism according to claim 2, wherein the first and second securing portions are arranged on opposite sides of said movable unit in a movement direction of the movable unit.

4. The linear guiding mechanism according to claim 3, wherein said guiding grooves comprise ball races providing a support for a linear ball bearing.

5. The linear guiding mechanism according to claim 3, wherein said movable guide comprises two raceways each guiding multiple balls such that ball roll axes of the balls contacting the ball races are arranged substantially parallel to each other and perpendicular to the travelling direction of the balls.

6. A securing device configured to be coupled to a movable unit of a linear guiding mechanism and to secure the movable unit to a guiding rail of the linear guiding mechanism, the securing device comprising:
   a first securing portion and a second securing portion arranged at a predetermined distance from each other; and
   a coupling portion comprising two support sections extending between and connecting the first and second securing portions, the coupling portion integrally formed with the first and second securing portions, and the coupling portion configured to couple the first and second securing portions to the movable unit;
   wherein the first securing portion, the second securing portion, and the coupling portion define an accommodating space for accommodating the movable unit; and
   wherein each of the first securing portion and the second securing portion is engageable with the guiding rail in case of a failure of the movable unit, to prevent the movable unit from coming off the guiding rail.

7. The securing device according to claim 6, wherein each securing portion comprises one or more abutment portions configured to limit a movement of the securing portion with respect to the guiding rail in at least a direction different to the movement direction of the movable unit.

8. The securing device according to claim 7, wherein at least one of the one or more abutment portions is integrally formed with the securing portion.

9. The securing device according to claim 8, wherein each abutment portion is configured to protrude into an elongate groove formed in said guiding rail.

10. The securing device according to claim 9, wherein at least one abutment portion is at least partially formed on the basis of the shape of a respective elongate groove of the guiding rail.

11. The securing device according to 10, wherein each securing portion comprises two abutment portions extending towards each other with a configuration to protrude into respective elongate grooves formed on opposite sides of said guiding rail.

12. The securing device according to claim 6, wherein said support sections are at least partially flat and extend substantially in parallel to each other, wherein each support section comprises a supporting surface for contacting a mounting surface of said movable unit, and wherein said support sections are coupled to said securing portions such that said abutment portions are arranged at a predetermined distance from said supporting surfaces.

* * * * *